United States Patent [19]

Last

[11] 4,061,199
[45] Dec. 6, 1977

[54] CHASSIS FOR A VEHICLE CAPABLE OF TRAVELLING OVER OBSTRUCTIONS

[75] Inventor: Werner Last, Hamburg, Germany

[73] Assignee: Karl-Heinz Werner Toosbuy, Bredebro, Denmark

[21] Appl. No.: 635,488

[22] Filed: Nov. 26, 1975

[30] Foreign Application Priority Data

Dec. 3, 1974 Germany ............................ 2457013

[51] Int. Cl.$^2$ ............................................. B62D 57/02
[52] U.S. Cl. .................................. 180/8 A; 180/8 F; 280/5.22; 280/5.26
[58] Field of Search ............. 180/8 A, 8 F, 8 B, 8 R, 180/DIG. 3; 280/5.26, 5.22, 5.2, 47.31; 305/19, 1

[56] References Cited

U.S. PATENT DOCUMENTS

| | | | |
|---|---|---|---|
| 2,742,973 | 4/1956 | Johannesen | 180/8 A |
| 3,049,364 | 8/1962 | Clay | 180/9.22 |
| 3,191,953 | 6/1965 | Aysta | 280/5.22 |
| 3,196,970 | 7/1965 | Brenner | 180/8 A |
| 3,292,722 | 12/1966 | Bamberg | 280/5.22 |
| 3,348,518 | 10/1967 | Forsyth et al. | 180/8 A |
| 3,730,287 | 5/1973 | Fletcher | 180/8 A |

FOREIGN PATENT DOCUMENTS

| | | | |
|---|---|---|---|
| 1,328,648 | 4/1963 | France | 180/9.22 |
| 58,008 | 9/1967 | Germany | 180/8 A |

*Primary Examiner*—Joseph F. Peters, Jr.
*Assistant Examiner*—David M. Mitchell
*Attorney, Agent, or Firm*—Pollock, Vande Sande & Priddy

[57] ABSTRACT

The invention relates to a chassis for a vehicle capable of travelling over obstacles. Besides roadwheels and step wheels an endless elastic belt is provided, the elastic belt engaging portions of the step wheel peripheries. The elastic belt is coupled to a drive as a result of which the step wheels are driven by the belt. Field of application: Wheelchairs, sack or baggage trucks, and cross-country vehicles.

15 Claims, 11 Drawing Figures

CHASSIS FOR A VEHICLE CAPABLE OF TRAVELLING OVER OBSTRUCTIONS

This invention relates to a chassis for a vehicle capable of travelling over obstructions and having roadwheels and step wheels which are interconnected by an endless flexible belt running on their peripheries.

A chassis has been proposed having a multi-armed spider wheel rotatably mounted on an axle, a wheel being rotatably mounted at the outer end of each arm of the spider, and in which all the wheels are so interconnected that rotary movement of one wheel causes simultaneous rotary movement of the other wheels of the spider, and the axle of the spider wheel is rotatably connected to one of these wheels, the axle of the spider wheel being driven by a motor. This chassis has the drawback that an extremely high torque is required to drive the wheels, necessitating an extremely powerful drive motor and the use of large amounts of power for negotiating steps. The rolling movement of the spider wheel occurs exclusively on the peripheries of the wheels, so that a jerky movement results when negotiating steps.

A chassis for a vehicle for climbing steps or stairs has also been proposed, in which an endless flexible belt passes around several step wheels. In this case, the step wheels are themselves driven, and in turn drive the flexible belt. This chassis does in fact achieve a less jerky motion when negotiating steps, but considerable drive power and high torque are required on the step wheels. As with the chassis first mentioned above, here also considerable friction losses occur during driving of the individual step wheels.

In another proposed chassis several wheels are arranged one behind another in the direction of travel of the chassis, and an endless flexible belt in the form of a Caterpillar (Trade Mark) track passes around said wheels. In this case, the wheels are spaced so closely one behind another that steps being negotiated cannot substantially deform the endless track, and this leads to the vehicle negotiating the steps resting with its entire weight on the edges of the steps, and possibly damaging them.

A common factor in all previously proposed chassis is that, as a result of their complex construction, they are extremely heavy and unwieldy, so that their use, for example in a wheelchair, is very restricted. The chassis renders the wheelchair so heavy that it is very inconvenient for normal use on flat roadways. These chassis are also unsuitable for attachment to a conventional wheelchair, as they necessitate extensive alteration and reinforcement of the frame. They are too heavy, and require greater structural dimensions in the wheelchair.

An object of the present invention is therefore to provide a chassis for a vehicle capable of travelling over obstructions, for which a small driving torque is sufficient, and which is small and light enough to be attached to and be removed from a conventional wheelchair with a few manual operations.

According to the invention there is provided a chassis for a vehicle capable of travelling over obstacles, and having roadwheels, and step wheels connected by an endless elastic belt engaging portions of their peripheries in which the elastic belt is coupled to at least one drive, so that, in operation, the step wheels are driven by the belt.

Such a chassis requires only a small amount of torque for negotiating steps, as the drive forces are applied to the periphery of the step wheels via the flexible belt. Thus, it is possible to use an electrical drive with a motor of relatively low power and a low capacity battery. Frictional losses caused by expensive drive systems are avoided.

When the chassis is incorporated in a wheelchair, stairs may also be negotiated by manual operation. Without great expenditure of energy, an assistant can drive the chassis via a lever drive, and thus move the wheelchair up stairs. Because the flexible belt is pressed so far in by the edges of the steps that the step wheels lie upon the steps, the edges of said steps are protected from damage. As the required torque is relatively low, the motor and drive system as well as the battery may be of very small dimensions, resulting in a considerable reduction in weight. As the chassis may be incorporated in conventional wheelchairs, no expensive special construction of chair is necessary. When such a wheelchair is electrically driven, the user can go both up and down stairs without additional assistance. A result of fitting the chassis with an elastic belt is that the movement from step to step takes place virtually without jerking, to the advantage of the user of the wheelchair. As a result of the relatively simple construction of the chassis, breakdown caused by foreign bodies or other impurities very rarely occurs.

When the chassis is used in a sack or baggage truck or barrow, large loads may be moved up and down stairs almost without jerks, and without external help. When the chassis is incorporated in a powered vehicle, the latter is capable of travelling across country, and is thus capable of negotiating large obstacles in its path. This is of particular importance for vehicles used in open country, but they may also serve as fully viable road vehicles, as they are fitted with normal roadwheels in addition to said chassis.

Embodiments of the invention will now be described, by way of example, with reference to the accompanying diagrammatic drawings, in which.

Figure 1:
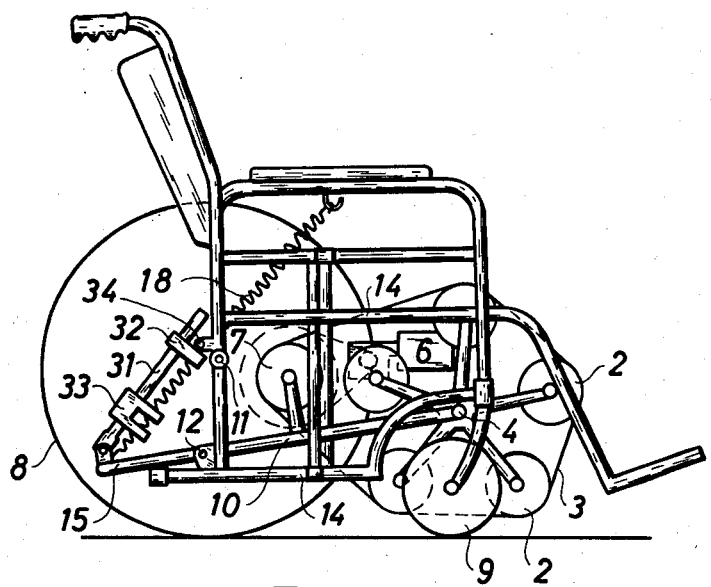
FIG. 1 is a side view of one embodiment of the chassis, incorporated in a wheelchair, and in an inoperative position.
Figure 2:
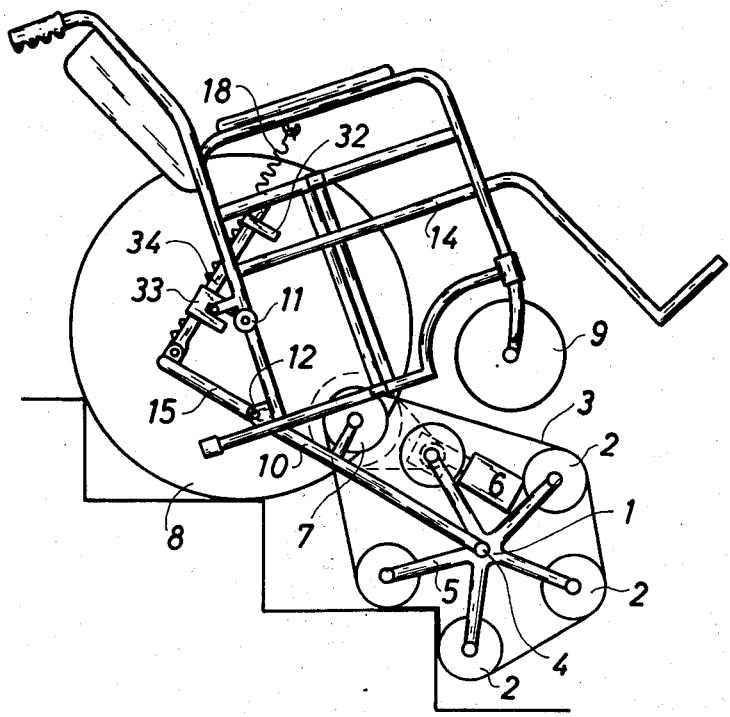
FIG. 2 is a view corresponding to FIG. 1, and showing the chassis negotiating stairs.

A chassis consists of a support spider 1, several step wheels 2, and an endless elastic belt 3. The spider 1 is rotatably supported by its hub on a main axle 4. Arms 5 of the spider 1 radiate uniformly outwards from the main axle 4, and carry at their ends the rotatable wheels 2. The elastic belt 3 extends around the wheels 2 and engages a peripheral portion of each, and provides the wheels 2 with an intense static friction. The belt 3 is coupled to a drive 6, which, when in use, moves the belt 3 around the support spider 1, and, in this way, the step wheels 2 are driven. A suitable drive system 6 which has a drive wheel 7 driving the belt 3 preferably provided outside the support cpider, and one or more step wheels, is conveniently mounted, for example, on beam 10.

The chassis is preferably incorporated in a wheelchair, supported in the vicinity of its center of gravity by large roadwheels 8 mounted on an axle 11. In this case, the chassis is located on beam 10, the support spider 1 being located near the front of the wheelchair, on one end of the beam 10, while the other end of the beam 10 is pivotally supported near the axle 11 on a shaft 12. It is also possible to support the beam 10 on the axle 11 of the large roadwheels 8. Between the beam 10 and a frame 14 of the wheelchair, there is provided a pivoting mechanism, with whose help the wheelchair may be pivoted when stairs are to be negotiated. In this case, the wheelchair is swung backwards into a position in which the backrest is inclined backwards in such a way that the front end of the wheelchair which is provided with the small roadwheels 9 is raised. The pivoting mechanism preferably consists of a ratchet lever 31 with ratchet or catches 32 and 33, and a bracing element 18, preferably consisting of a pair of tension springs. The ratchet lever 31 is preferably pivotally linked to an extension 15 of the beam 10 and, depending upon the position of the wheelchair, co-acts, in a conventional manner, through its ratchet or catch 32 or 33, with a shaft 34 to fix the wheelchair in the desired position.

Figure 6:
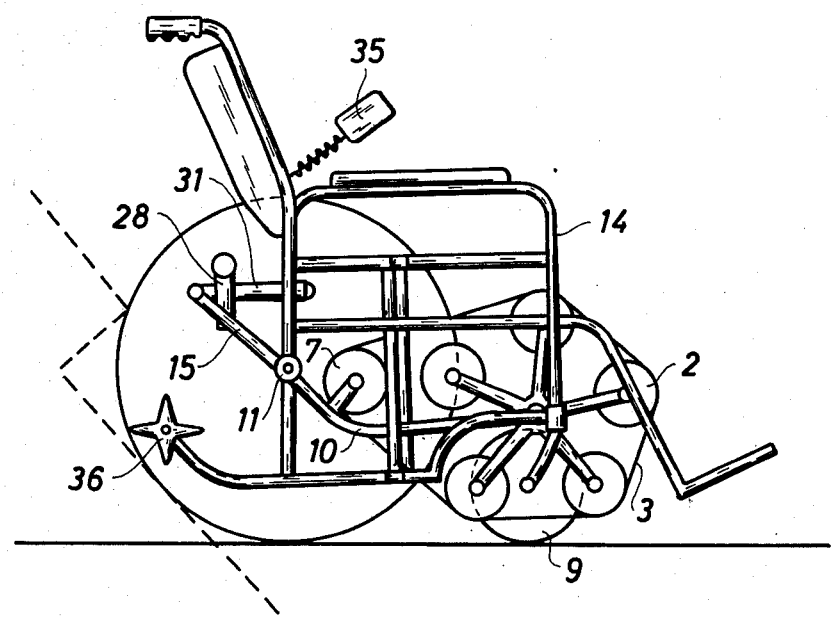
FIG. 6 is a view corresponding to FIG. 1, showing a preferred pivoting mechanism, designed as a motor-driven worm drive.

The pivoting mechanism may be designed as a worm drive 28 (FIG. 6), and the worm drive may be driven by a motor. In order to negotiate stairs, the wheelchair is driven with the large roadwheels 8 to the first step of the stairs, and the wheelchair is pivoted. A safety belt 35 secures the user. A support located on frame 14, and preferably designed as a star wheel, limits the oblique position of the wheelchair, and prevents it tipping over backwards.

Thereupon, the drive system 6, preferably an electric motor, is switched on, setting the elastic belt 3 in motion via the drive wheel 7, thus pushing the wheelchair against the flight of steps. The user now drives the large roadwheels 8 forward in an assisting fashion. Thus, the wheelchair is moved up the first step, until the chassis comes into contact with the vertical surface or riser of the first step. In this way, the step wheel 2 meeting this surface is prevented from rotating further. As, however, the drive wheel 7 continues to drive the elastic belt 3, the spider 1 and its main axle 4 are rotated, and the second step wheel 2 contacts the horizontal surface or tread of the first step, is supported thereon, and pushes the chassis and thus the wheelchair upwards. The step wheels 2 continue to rotate until the step wheel 2 lying closest to the vertical surface of the following step contacts this step and again has its rotary movement arrested. Thereafter, the procedure described above is repeated.

Figure 4:
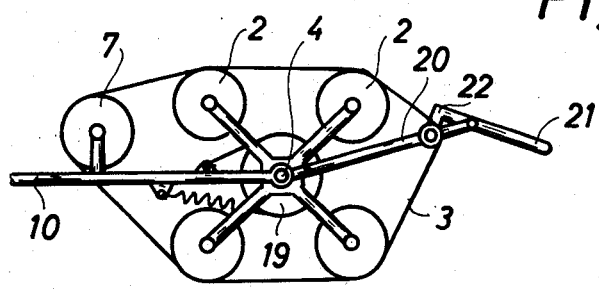
FIG. 4 shows a chassis corresponding to that in FIG. 1, with two drive systems.

In order to prevent rolling back of the wheelchair during negotiation of the stairs, the chassis is provided with a brake 19 (FIG. 4), hereinafter and in the appended claims referred to as a reverse brake, which brake prevents reverse rotary movement of the spider 1 and of the step wheels 2. The brake 19 is designed as a manually operated cable brake preferably acting through at least two bands around a brake drum. It may however also be designed as a locking-pawl mechanism.

After mounting the last step of the stairs, the wheelchair is pivoted back into its normal position. After the small roadwheels 9 have again contacted the roadway, the chassis is raised and fixed above the level of the small roadwheels 9.

When the wheelchair is travelling down a staircase, the procedure above described takes place in reverse order, with the difference only that the brake 19 is inoperative, or is used only if the drive motor 6 fails. Normally, the drive motor 6 generates the necessary braking effect which prevents the descent from being too rapid.

It is also possible to provide the chassis with a spring motor whose spring is tensioned when going downstairs, and which, when re-ascending the stairs, serves to reinforce the drive system 6, or to replace it.

Figure 5:
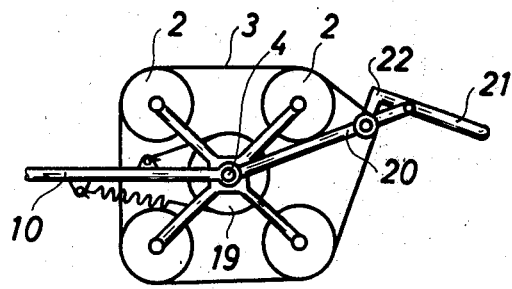
FIG. 5 shows a chassis corresponding to that in FIG. 1, with lever operated manual drive.

The chassis can also be fitted, in addition to the drive system 6, or alternatively thereto, with a manual lever drive. In this case, a fork 20 (FIG. 5), bridging the spider 1, is connected to the axle 4, and has, at its end remote from the axle 4, a manual lever 21 and a clamp or gripper device 22, which exerts a clamping or gripping action on the elastic belt 3.

When the wheelchair is to travel up a flight of steps, it is again driven on its large roadwheels 8 up to the vertical surface of the first step, and the chassis is lowered. However, in this case a helper is necessary to actuate the lever drive, in order to move the belt 3 around the spider 1. The step wheels 2 are likewise provided with drive on their respective external peripheral portions. For this purpose, the manual lever 21 with the fork 20 and the device 22 attached thereto are pivoted upwards, while the elastic belt 3 is held fast in the device 22. When the lever drive has reached its highest position, the manual lever is pivoted back downwards, the gripper device 22 releases the belt 3, and the fork is pivoted downwards. When the lever drive has reached its bottom position, the manual lever 21 is again raised, and the clamp device 22 again holds fast the belt 3. Otherwise, the operation of the chassis and the wheelchair is identical to that of an electrical drive.

Figure 3:
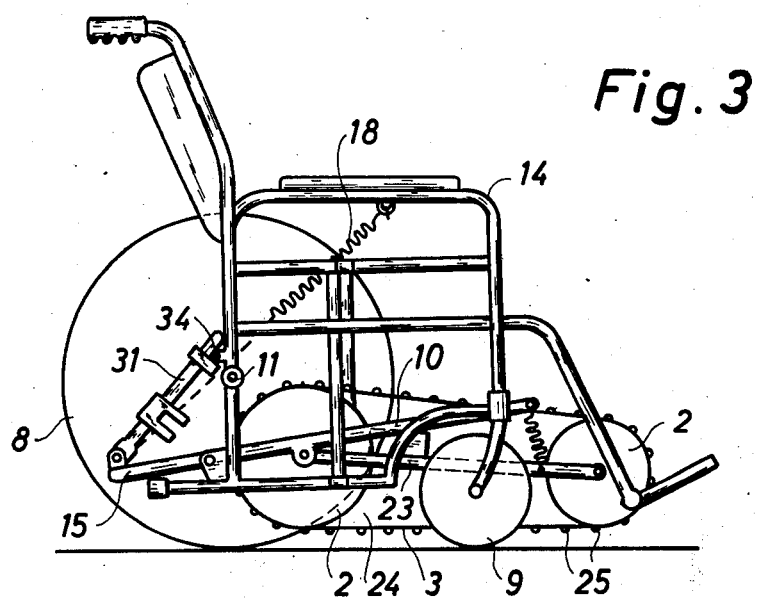
FIG. 3 is a side view of another embodiment of the chassis, incorporated in a wheelchair, and in an inoperative position.

In a further embodiment of the invention, FIG. 3, two step wheels 2 are located one behind the other in a support frame 23 in the direction of travel of the vehicle, the support frame 23 being substantially vertically pivotally connected to the beam 10. Between the two step wheels 2 there is provided an interspace 24, for accommodating at least one step edge. In this embodiment, the belt is provided with externally projecting ridges 25 to prevent slippage of the elastic belt 3, and thus of the entire chassis, from the steps. One of the two step wheels is designed as a drive wheel, and is connected to the drive system 6, which is preferably an electric motor. It is, however, also possible to provide, as an additional or alternative drive, (such as that shown in FIG. 5) a manual lever drive, which is vertically pivotally connected via a fork on the axle of the step wheel 2 adjacent to the small roadwheels 9, and is fitted with a maual lever and with a gripper device acting on the elastic belt 3 through the ridges 25.

The chassis according to this embodiment is preferably vertically pivotally connected to a wheelchair by a beam 10, which is otherwise provided with the same devices as those provided in the above described embodiments. In this case, the step wheel 2 located near the large roadwheels 8 is larger than the other step wheel 2, to whose axle the fork of the manual lever drive is linked. The version with the larger wheel simplifies climbing steps, while the smaller step wheel 2 simplifies the use of the manual lever drive. The support frame 23 is sprung relative to the beam 10 in such a way that the larger step wheel 2 is pushed downwards in the direction of the roadway.

In the inoperative position, the chassis is raised and fixed above the small roadwheels 9 of the wheelchair, while the wheelchair rests on the roadwheels 8 and 9. When the wheelchair is to travel up steps, it is firstly driven with the large roadwheels 8 up to the vertical surface of the first step. Then, the chassis is lowered on to the roadway, the wheelchair is pivoted, and the drive 6 is engaged, or the manual lever system operated, in such a way that the elastic belt 3 is moved around the wheels 2 and the large roadwheels 8 are moved up the first or the first two steps, until the chassis with the elastic belt 3 and the larger wheel 2 contacts the vertical surface of the first step. The larger step wheel 2 runs up the vertical surface and runs over the edge formed by the vertical and horizontal surfaces of the step, and is supported on the horizontal surface of the step, while the smaller wheel 2 still remains on the flat surface in front of the step. The edge of the step presses into the interspace 24 between the step wheels 2, so that the weight is taken almost exclusively by the horizontal surfaces of the step and of the roadway in front of the step. In this way, damage to the edges of the steps is avoided. When the drive 6 is engaged, the larger wheel 2 climbs the following step and draws the smaller wheel 2 after it. The ridges 25 on the belt 3 prevent slipping of said belt from the edges of the step. After climbing the step, the wheelchair is pivoted back into its normal position, so that all the four roadwheels 8 and 9 are in contact with the ground, and the chassis is raised from the roadway and is fixed above the level of the small roadwheels 9.

When going down a flight of steps, the procedure above is carried out in the reverse order.

Figure 7:
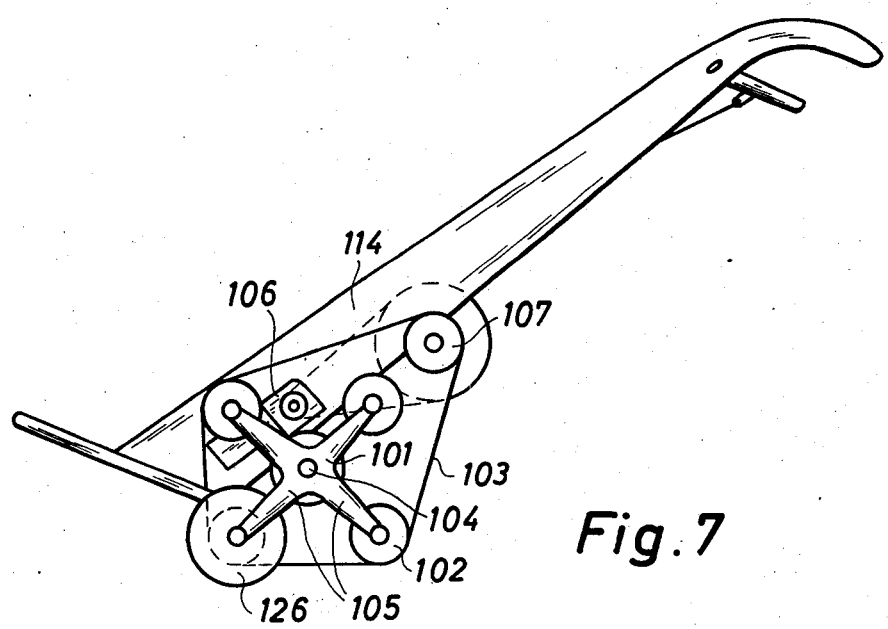
FIG. 7 is a side view of a chassis as shown in FIG. 1, incorporated in a sack or baggage truck or barrow.
Figure 8:
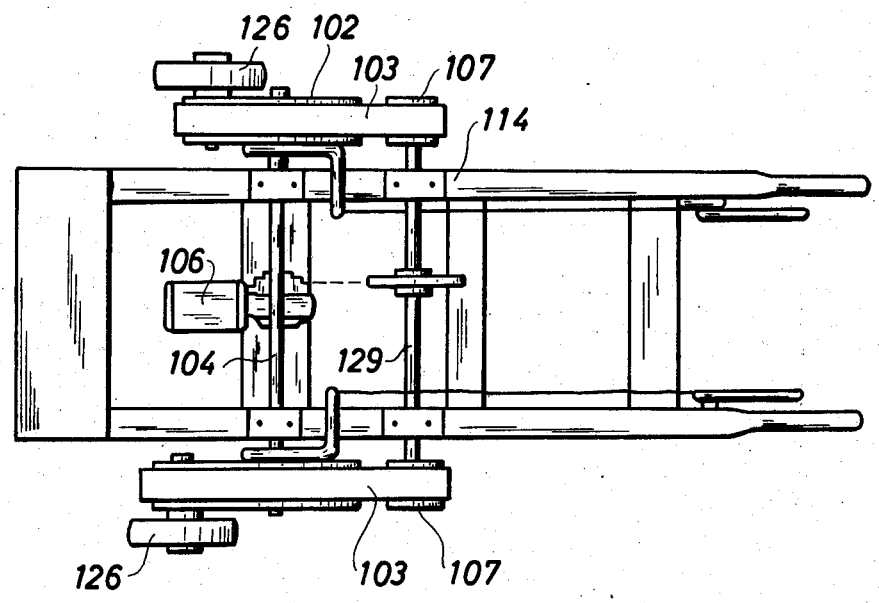
FIG. 8 is a bottom plan view corresponding to FIG. 7.

It is also possible to provide a sack or baggage truck or barrow, FIGS. 7 and 8, with a chassis as described above, i.e., with a spider 101, several step wheels 102, and an elastic belt 103. In this case, a spider is located on each side of the frame of the barrow. On each spider there is also mounted a roadwheel 126 for permanent use. A drive or motor 106 is attached to the frame 114 of the barrow, and drives a shaft 129, which carries a drive wheel 107 at each end outside the frame. The drive wheels 107, in the operative position, drive the elastic belts 103 of both spider, and thus move the barrow in a similar manner to the wheelchair up or down stairs. In the inoperative position, the spider is rotated around its main axle 104 until roadwheels 126 reach their lowest position. In this position, the spider is inoperative, and the barrow is used for normal purposes.

Figure 9:
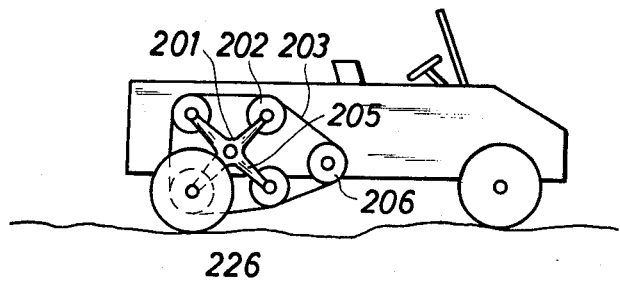
FIG. 9 is a side view of the embodiment according to FIG. 6, incorporated in a cross-country vehicle.
Figure 10:
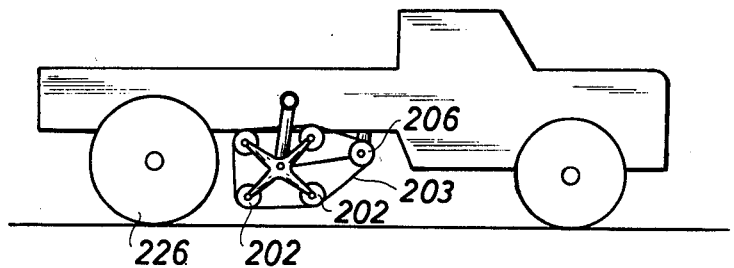
FIG. 10 is a side view of the embodiment according to FIG. 1 in an inoperative position in a cross-country vehicle with a conventionally driven rear axle.
Figure 11:
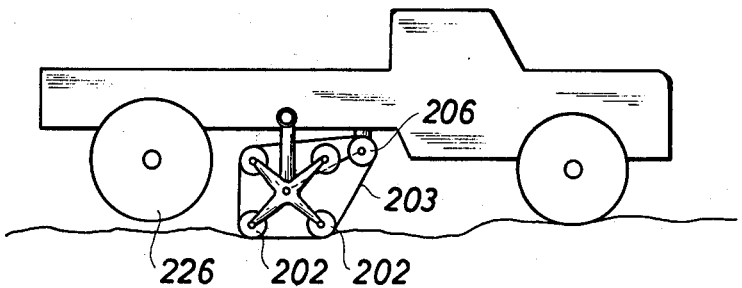
FIG. 11 is a view corresponding to FIG. 10 showing the chassis in an operative position.

A chassis, FIG. 9, with a spider 201, step wheels 202 and an elastic belt 203 may also be used in a cross-country vehicle for overcoming obstacles on the ground, two chassis per axle being provided. In such a vehicle also, a shaft of a step wheel 202 carries a roadwheel 226 for normal operation. It is, however, also possible to provide for such a roadwheel its own axle, and to raise and fix the chassis clear of the roadway in the inoperative position, FIG. 10. When larger obstacles are to be overcome, the chassis are preferably hydraulically lowered, until they remove the load from the roadwheels 226, FIG. 11. In this embodiment also, the drive 206 for the elastic belt is located outside the spider 201 provided with wheels 202. The method of operation of the chassis in a cross-country vehicle is substantially identical to that of the chassis incorporated in the wheelchair.

I claim:

1. A mechanism for a vehicle having a frame capable of travelling over obstacles, comprising
   a. a chassis;
   b. roadwheels supporting the frame;
   c. a spider rotatably connected to the chassis and having a plurality of step wheels rotatably mounted at the ends of its arms;
   d. endless elastic belt means connecting the step wheels by engaagement with their peripheries;
   e. the distance between successive step wheels being sufficient to permit the belt means to fold into engagement with the riser and tread of a stair step encountered by the vehicle; and
   f. a drive means on said vehicle, including a drive wheel disposed outside the periphery of the spider, for directly engaging and driving the belt means.

2. A mechanism according to claim 1, wherein the elastic belt is a Caterpillar type track with externally projecting ridges.

3. A mechanism according to claim 1, wherein the spider has arms radiating outwards in a star pattern from a rotary axis, the step wheels being rotatably mounted on the ends of said arms.

4. A mechanism according to claim 1, wherein the drive means is a discontinuous drive operated by a lever.

5. A mechanism according to claim 1, wherein a portion of the drive means is located within the periphery of the spider and is provided with a power transmission to said drive wheel on the outside of the periphery of the spider.

6. A mechanism according to claim 1, including means for selectively positioning the spider in operative or inoperative position in which said step wheels are, respectively, in contact and out of contact with the ground.

7. A mechanism according to claim 1, including a beam mounted on the frame for pivoting movement into an inoperative position for normal operation of the vehicle in which said step wheels are out of contact with the ground, the spider being rotatably mounted on the beam.

8. A mechanism according to claim 1, wherein the chassis is attached to a wheelchair, said roadwheels comprising first roadwheels of relatively large diameter, said frame including a seat portion of the wheel chair, and second roadwheels of relatively small diameter supporting a front portion of the wheel chair frame, a pivoting means being provided for pivoting the wheelchair frame relative to the spider into a position in which the seat is canted backwards and the said second roadwheels are raised.

9. A mechanism according to claim 8, wherein said pivoting means includes a beam supporting said spider, said beam being pivoted about an axle of said first roadwheels.

10. A mechanism according to claim 9, wherein said pivoting means further includes at least one bracing element between said beam and the frame of the wheelchair for connecting the pivoting means to the wheel chair.

11. A mechanism according to claim 9, wherein the beam is connected to a shaft mounted on said frame.

12. A mechanism according to claim 1, wherein the chassis is incorporated in the frame of a baggage carrier vehicle, and the drive means is attached to the frame of said carrier vehicle.

13. A mechanism according to claim 1, wherein the chassis is incorporated in a cross-country vehicle, and the roadwheels have a separate drive system.

14. A mechanism according to claim 1, wherein the spider is provided with a reverse brake.

15. A mechanism according to claim 14, wherein said brake is a manually operable cable brake acting through at least two bands extending around a brake drum.

* * * * *